(12) United States Patent
Adi

(10) Patent No.: US 9,100,827 B2
(45) Date of Patent: *Aug. 4, 2015

(54) METHOD FOR CRYPTOGRAPHICALLY VERIFIABLE IDENTIFICATION OF A PHYSICAL UNIT IN A PUBLIC, WIRELESS TELECOMMUNICATIONS NETWORK

(71) Applicant: Ipcom GmbH & Co. KG, Pullach (DE)

(72) Inventor: Wael Adi, Braunschweig (DE)

(73) Assignee: IPCOM GMBH & CO. KG, Pullach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/161,268

(22) Filed: Jan. 22, 2014

(65) Prior Publication Data

US 2014/0235207 A1 Aug. 21, 2014

Related U.S. Application Data

(63) Continuation of application No. 13/619,569, filed on Sep. 14, 2012, now Pat. No. 8,638,933, which is a continuation of application No. 10/296,702, filed as application No. PCT/DE01/01180 on Mar. 28, 2001, now Pat. No. 8,271,787.

(30) Foreign Application Priority Data

May 26, 2000 (DE) .................................. 100 26 326

(51) Int. Cl.
*G06F 21/00* (2013.01)
*H04W 12/06* (2009.01)
(Continued)

(52) U.S. Cl.
CPC .............. *H04W 12/06* (2013.01); *H04L 9/3247* (2013.01); *H04L 9/3271* (2013.01); *H04L 63/126* (2013.01); *H04W 12/10* (2013.01); *H04L 2209/26* (2013.01); *H04L 2209/80* (2013.01)

(58) Field of Classification Search
None
See application file for complete search history.

(56) References Cited

U.S. PATENT DOCUMENTS 5,299,263 A * 3/1994 Beller et al. ..................... 380/30
5,703,949 A * 12/1997 Rosen ............................. 705/65
(Continued)

FOREIGN PATENT DOCUMENTS

EP 0800293 A2 10/1997
WO 00/01187 A1 1/2000

OTHER PUBLICATIONS

Brutch, Tasneem G.; Brutch, Paul C. Mutual Authentication, Confidentiality, and Key MANagement (MACKMAN) System for Mobile Computing and Wireless Communication. Proceedings, 14th Annual Computer Security Applications Conference. Pub. Date: 1998. Relevant pp. 308-317. http://ieeexplore.ieee.org/stamp/stamp.jsp?tp=&arnumber=738651.*

(Continued)

*Primary Examiner* — Dede Zecher
*Assistant Examiner* — Jeremiah Avery
(74) *Attorney, Agent, or Firm* — Nelson Mullins Riley & Scarborough LLP

(57) ABSTRACT

A method for identification of a physical unit (M) storing a secret identity (SIMEI) and an open identity (IMEI) in memory in a physical unit (M); generating a first parameter (CHv) in the testing device (P); sending an identity request (IR) with the first parameter (CHv) from the testing device (P) to the physical unit (M); generating an electronic signature (SIGt) by use of a first cryptographic function (F3) from the secret identity (SIMEI) and at least the first parameter (CHv) in the physical unit (M), and sending SIGt and the open identity (IMEI) to the testing device (P); and identifying the physical unit (M) by a comparison of the electronic signature (SIGt) sent and a corresponding electronic signature (SIGv) in the generated testing device (P).

7 Claims, 4 Drawing Sheets

Figure 1:
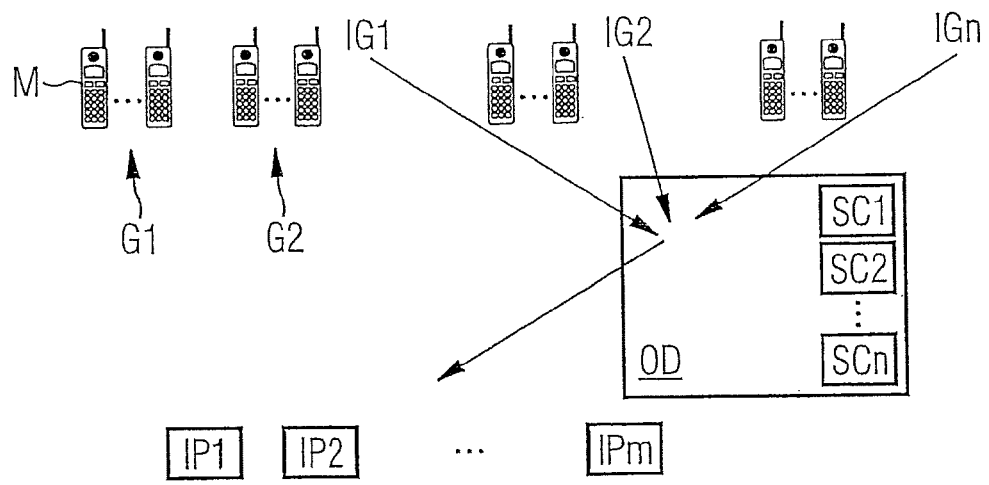

(51) Int. Cl.
*H04L 9/32* (2006.01)
*H04L 29/06* (2006.01)
*H04W 12/10* (2009.01)

(56) References Cited

U.S. PATENT DOCUMENTS

| | | | | |
|---|---|---|---|---|
| 6,088,797 | A * | 7/2000 | Rosen | 713/173 |
| 6,119,000 | A * | 9/2000 | Stephenson et al. | 455/432.1 |
| 6,175,921 | B1 * | 1/2001 | Rosen | 713/173 |
| 6,334,190 | B1 | 12/2001 | Silverbrook et al. | |
| 6,338,140 | B1 * | 1/2002 | Owens et al. | 713/168 |
| 6,367,013 | B1 * | 4/2002 | Bisbee et al. | 713/178 |
| 6,430,407 | B1 * | 8/2002 | Turtiainen | 455/411 |
| 6,463,055 | B1 | 10/2002 | Lupien et al. | |
| 6,463,537 | B1 | 10/2002 | Tello | |
| 6,556,820 | B1 * | 4/2003 | Le et al. | 455/411 |
| 6,580,906 | B2 * | 6/2003 | Bilgic et al. | 455/422.1 |
| 6,708,273 | B1 * | 3/2004 | Ober et al. | 713/189 |
| 6,879,568 | B1 * | 4/2005 | Xu et al. | 370/321 |
| 6,928,558 | B1 * | 8/2005 | Allahwerdi et al. | 726/9 |
| 7,233,948 | B1 * | 6/2007 | Shamoon et al. | 707/999.009 |
| 8,271,787 | B2 | 9/2012 | Adi | |
| 8,638,933 | B2 | 1/2014 | Adi | |

OTHER PUBLICATIONS

Freudenthal, Margus; Heiberg, Sven; Willemson, Jan. Personal Security Environment on Palm PDA. 16th Annual Conference Computer Security Applications, 2000. ACSAC '00. Pub. Date: 2000. Relevant pp. 366-372. http://ieeexplore.ieee.org/stamp/stamp.jsp?tp=&arnumber=898891.*

Wu, Hsiao-Kuang; Yang, Shu-ching; Lin, Yung-Tai. The Sharing Session Key Component (SSKC) Algorithm for End-to-End Secure Wireless Communication. Proceedings, IEEE 34th Annual 2000 International Carnahan Conference on Security Technology. Pub. Date: 2000. Relevant pp. 242-250. http://ieeexplore.ieee.org/stamp/stamp.jsp?tp=&arnumber=891194.*

Brutch, Tasneem G.; Brutch, Paul C. Mutual Authentication, Confidentiality, and Key MANagement (MACKMAN) System for Mobile Computing and Wireless Communication. Proceedings, 14th Annual Computer Securitiy Applications Conference. Pub. Date: 1998. Relevant pp. 308-317. http://ieeexplore.ieee.org/stamp/stamp.jsp?tp=&arnumber=738651.*

3G TS 27.007 V3.3.0, "3rd Generation Partnership Project; Technical Specification Group Terminals; AT command set for 3GPP User Equipment (UE) (3G TS 27.007 version 3.3.0)," 14 pages (1999).

Choi, Hyung-Nam, "A System Concept for Mobile and Stationary Teleservice Applications," Industrial Electronics Society, IECON '98, Proceedings of the 24th Annual Conference of the IEEE, vol. 4:2079-2083 (1998).

Cooke, J.C. et al., "Cryptographic Security Techniques for Digital Mobile Telephones," ICWC '92, pp. 425-428 (1992).

Mehrotra, Asha, "Introduction to Global System for Mobile Communications," GSM System Engineering, Mobile Communications Series, Artech House Publishers, Boston, Chapter 1, pp. 1-17 (1997).

Stinson, Douglas R., "Classical Cryptography," Cryptography, Theory and Practice, 2nd Edition, Chapman & Hall/CRC, Kenneth H. Rosen (Ed.), Chapter 1, pp. 1-20 (1995).

Girardot, Y., "Bull CP8 Smart Cards Uses in Cryptology" Advances in Cryptology, Proceedings of Eurocrypt 84, Apr. 11, 1984, pp. 464-469.

PCT International Search Report, PCT/DE01/01180, dated Jan. 10, 2002, 6 pages.

* cited by examiner

METHOD FOR CRYPTOGRAPHICALLY VERIFIABLE IDENTIFICATION OF A PHYSICAL UNIT IN A PUBLIC, WIRELESS TELECOMMUNICATIONS NETWORK

RELATED APPLICATIONS

This application is a continuation of U.S. application Ser. No. 13/619,569, filed Sep. 14, 2013, which is a continuation of U.S. application Ser. No. 10/296,702, filed Aug. 1, 2003, which is in turn a U.S. national-phase application under 35 U.S.C. §371 based on international application PCT/DE01/01180 filed on Mar. 28, 2001, which claims priority to German Application No. 10026326.7, filed on Mary 26, 2000.

PRIOR ART

The present invention relates to a method for cryptographically verifiable identification of a physical unit in an open, wireless telecommunications network.

Although applicable to any arbitrary telecommunications devices, the present invention and the problems it is intended to solve will be explained here in terms of mobile telephone systems.

GSM mobile telephone systems and cryptographic methods pertaining to them are described for instance in "GMS System, Engineering" by Asha Mehrotra, Artech Haus Pub., 1996, or "Cryptography Theory and Practice" by D. R. Stinson, CRC Press, 1995.

The identity of a mobile terminal or (terminal) device is generally known as IMEI (International Mobile Equipment Identity). It individually identifies a single device and provides a complete unique specification for it.

Figure 7:
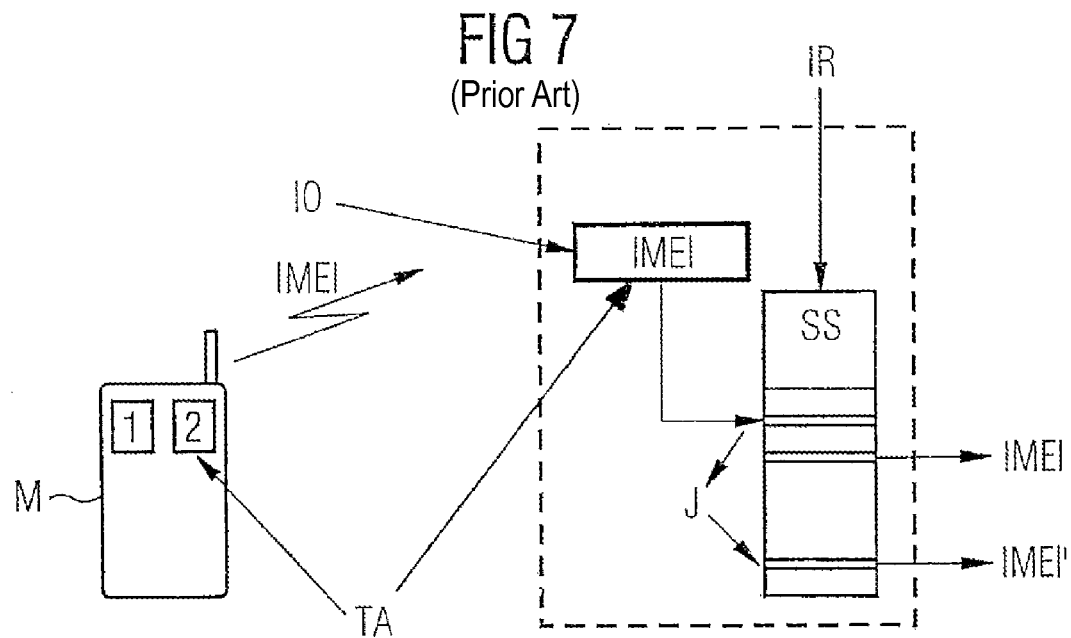

FIG. 7 is a schematic illustration of a known identification mechanism for identifying a mobile telephone to a network operator.

In FIG. 7, M represents a mobile telephone, with a central processing unit 1 and an identity module 2, which later has a secure-access region TA in which the identity IMEI is stored in memory.

The instantaneous recognition of such a device M (mobile equipment) in the GSM system is based today on the fact that the device M introduces itself publicly by means of its IMEI. There is a need for equipment manufacturers to assure that the IMEI in the device M cannot be modified, and that the software of the device M will always, upon request by the network, furnish only the correct IMEI that is stored in memory in the device.

The usage outlined in dashed lines in FIG. 1 is an illustration of the general implementation of this identification mechanism. After an identity request IR, the device M in reaction furnishes the parameter IMEI, which has been impressed into a protected memory cell by the manufacturer IO, to the network operator.

This method can easily be counterfeited. A software jump J in the software identification system SS can (as FIG. 1 shows) furnish any other identification IMEI', instead of the correct identification IMEI. This is possible whenever it is possible to alter the software of the device M, which is usually easy to do, or to alter the identity IMEI, which as a rule is somewhat more difficult. The greatest problem, however, is that cloned devices can furnish an identity IMEI arbitrarily. All one has to do is eavesdrop on the network a single time and learn one legal IMEI, because the IMEI is always sent in the open. One can also generate legitimate IMEI identifications oneself, however, since the setup is known. Thus this type of identification does not afford an especially high standard of security.

Figure 8:
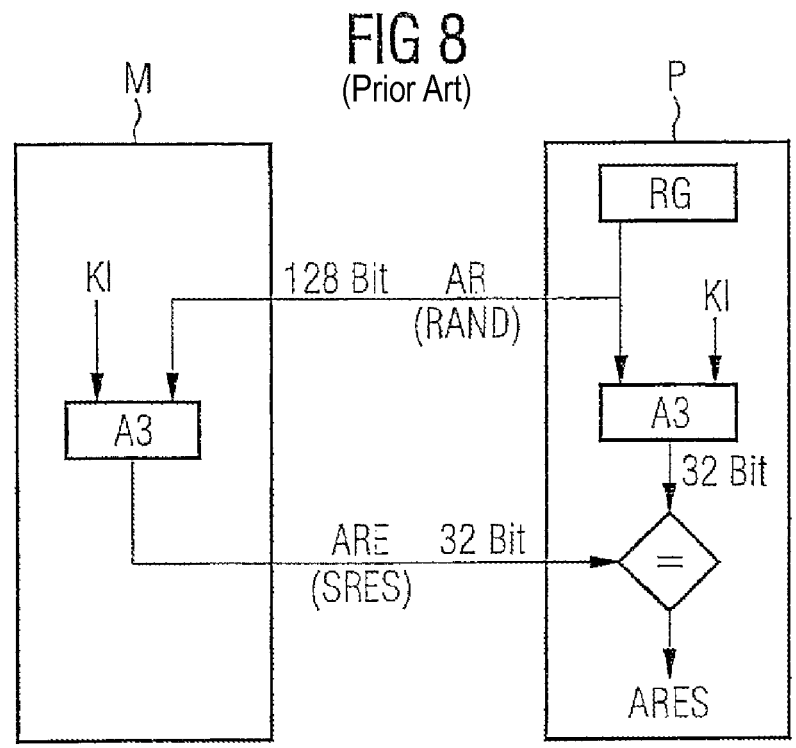

FIG. 8 is a schematic illustration of a further known identification mechanism for identifying a mobile telephone to a network operator, using the challenge & response technique.

Secured identification using the so-called challenge & response technique in cryptographic systems is a known technique of ascertaining the identity of a device.

As FIG. 8 shows, this technique is based on question and answer. The testing station P (for instance a base station of the network operator) sends an identity request AR to the device M being tested, with a random symbol sequence RAND or "challenge pattern" of 128 bits, generated in a random generator RG, and ask for a certain reaction ARE or "response" with a data word SRES comprising 32 bits, which proves that the tested device M has a certain secret value $K_i$ of 128 bits, just as does the testing station P; together with RAND, this response can be linked by a copy A3 with a test outcome SRES, which is returned by the tested device M to the testing station P.

The copy A3 is a highly nonlinear copy which is very difficult to reverse (it is often called a one-way function), as described by Asha Mehrotra as cited above. The copy A3 is as a rule selected to be a block enciphering process. The two entities, the tester P and the testee M, receive the same response SRES if the two secret keys $K_i$ are identical in the tester P and the testee M. If so, the identification result ARES is positive; if not, it is negative.

This process can be repeated multiple times with different random values RAND, to enhance the security. This method is already used in the GSM system, but only for identifying a user from his user card USIM. Because of the increased threat of cloning and theft of mobile radio devices, it has become increasingly necessary to integrate a mechanism with the mobile device that causes the device to identify itself, so that both stolen and cloned or non-certified devices in a network can be detected. However, this requires the knowledge of the parameter $K_i$ on the part of both the tester and the testee. However, since there are many service providers and manufacturers in a wireless network, complex administration is required, along with the exchange of all the $K_i$s in the network between manufacturers and network operators.

The number of units to be identified, and their manufacturers, in today's telecommunications networks is high and changes constantly. This increases the complexity and expense of administration and maintenance still further.

Advantages of the Invention

The invention enables the identification of a network unit by means of the simplest possible hardware infrastructure in the network, with the simplest possible administration and as little communication as possible.

The concept on which the present invention is base is that by a modified challenge & response technique, monitoring is done as to whether a physical unit contains a certain secret identity, without reading read this identity and even without knowing this identity beforehand. The genuineness of the identity of the physical unit or device is thus documented. The method of the invention is based on a secret cryptographic technique in combination with an assembly of particular hardware units, and with a protocol.

The method of the invention is based on storing a single secret identity in memory in a protected register inside the device to be identified, and on a secret manufacturer's key inside some item, such as a smart card, in the tester. The secret identity or the secret manufacturer's key is rendered non-readable by hardware equipment, as disclosed for instance in "GMS System Engineering" by Asha Mehrotra, Artech Haus Pub., 1996. The device, however, is capable of providing information on its own that proves the unique identity of the device by the challenge & response (C & R) technique.

The challenge & response technique is a technique known per se, and it is widely used in cryptographically secured systems for the sake of identification. The particular characteristics of this method are these:

- no register for the identities of the individual devices is needed;
- no joint knowledge by both tester and testee of the secret identity is necessary;
- the embodiment is adapted to the given conditions and environment of mobile telephones, with many service providers and manufacturers who operate internationally and have poor information-exchange and coordination capabilities; and
- the technique is based on units that are already present in the system.

The invention is an expansion of the challenge & response technique, for making the identification less complex and hence more flexible and less expensive.

Advantageous refinements of and improvements to the invention are found in the dependent claims.

In a preferred refinement, the open key is generated by a second cryptographic function from a first secret key and a second secret key.

In a further preferred refinement, the secret identity is generated by a third cryptographic function from the open identity and the second secret key.

In a further preferred refinement, the first secret key is stored in memory in the testing device, and the secret identity is generated in the testing device by means of the following steps: generating the second secret key by means of the inverse of the second cryptographic function from the first secret key and the open key; and generating the secret identity by means of the third cryptographic function from the open identity and the generated second secret key.

In a further preferred refinement, the open key is sent to the testing device over the internet.

In a further preferred refinement, generating a second parameter in the physical unit, sending the second parameter to the testing device, and generating the electronic signature and the corresponding electronic signature from the secret identity and the first and second parameters are performed.

In a further preferred refinement, the first and second parameters are linked by means of an exclusive-OR function.

In a further preferred refinement, the first and second parameters are multiplexed and then linked by means of an exclusive-OR function, with a feedback from the output of the first cryptographic function to the exclusive-OR.

In a further preferred refinement, the first and/or second parameters are provided in the form of random variables.

In a further preferred refinement, the telecommunications network is a mobile telephone system.

In a further preferred refinement, the first, second and third cryptographic functions are the identical function.

In a further preferred refinement, the identical function is a standard function.

In a further preferred refinement, steps e) and f) are performed on a smart card in the testing device.

DRAWINGS

Exemplary embodiments of the invention are shown in the drawing and explained in further detail in the ensuing description.

Figure 2:
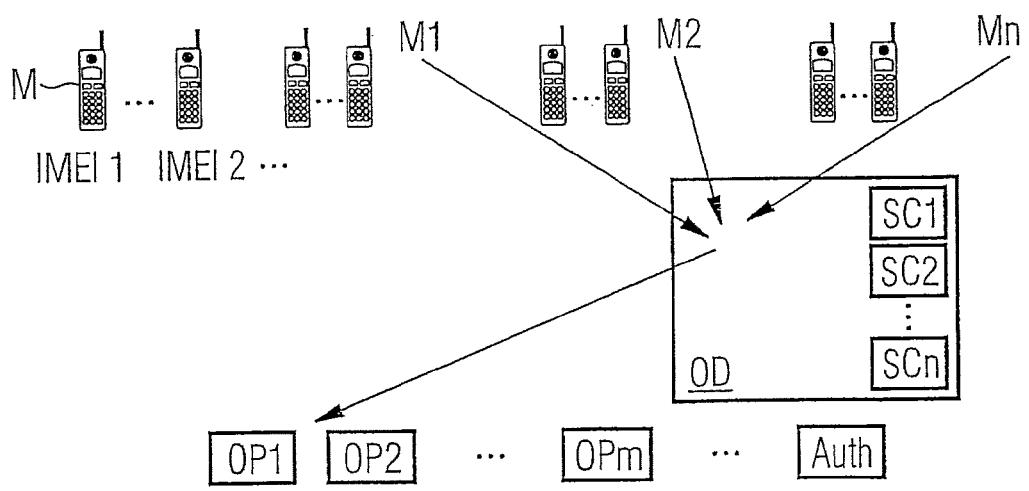
Figure 3:
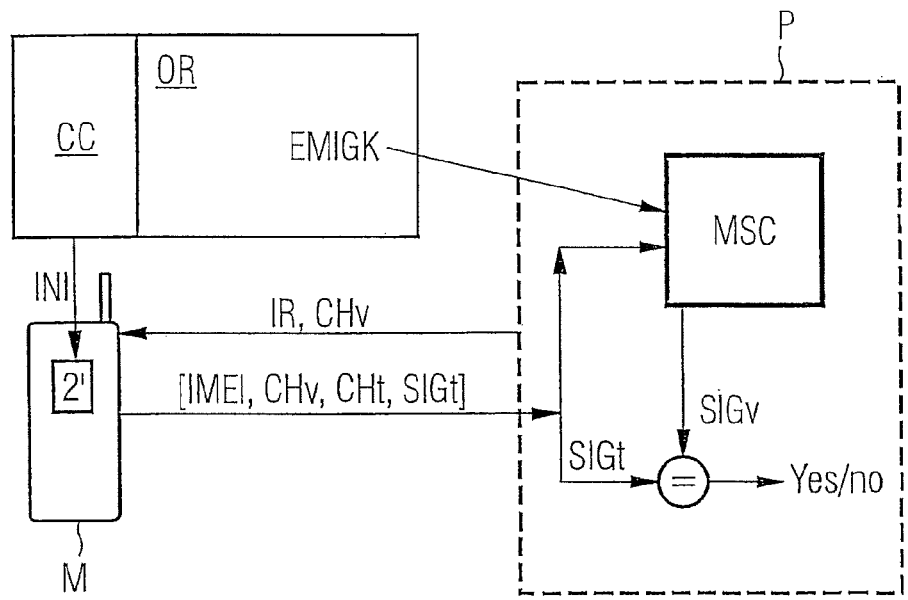
Figure 4:
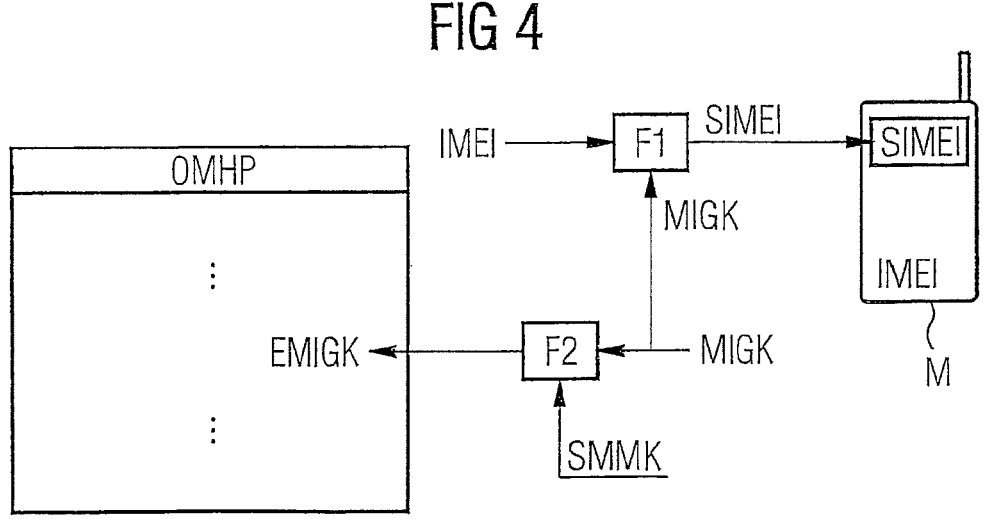
Figure 5:
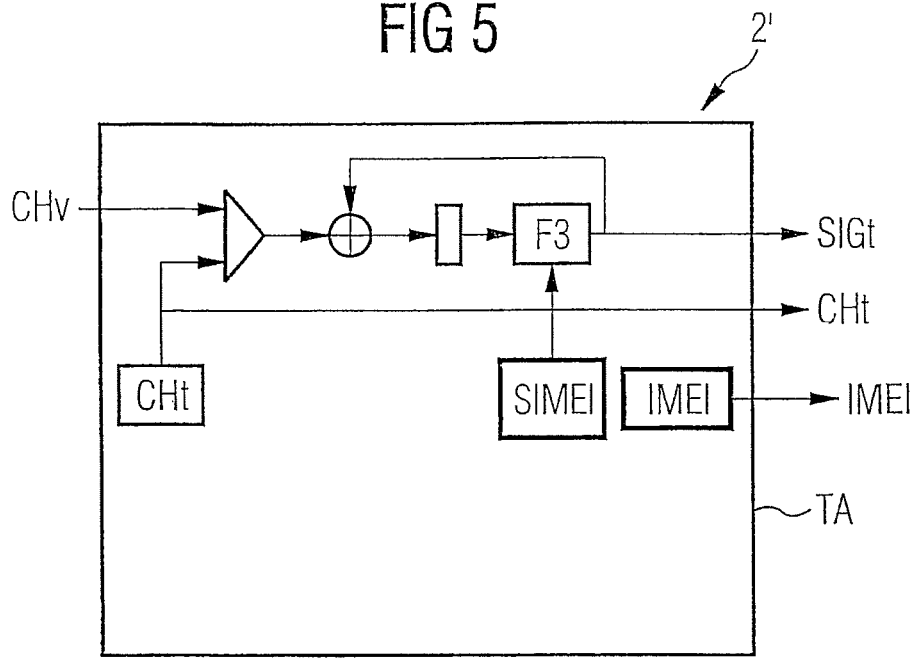
Figure 6:
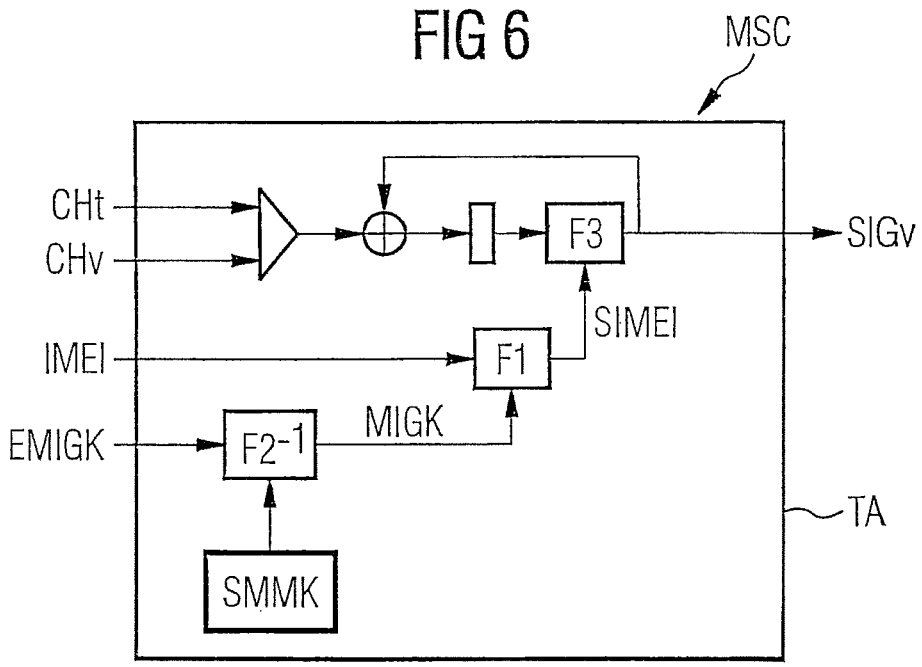

Shown are:

FIG. 1, a schematic diagram of the subscribers and of the system structure in a first embodiment of the method of the invention;

FIG. 2, a schematic diagram of the subscribers and of a special system structure in the first embodiment of the method of the invention;

FIG. 3, the fundamental principle of the first embodiment of the method of the invention;

FIG. 4, the preliminary initialization procedure INI in the first embodiment of the present invention;

FIG. 5, the identity module in the mobile telephone, and its function, in the first embodiment of the present invention;

FIG. 6, the smart card in the tester, and its function, in the first embodiment of the present invention;

FIG. 7, a schematic diagram of a known identification mechanism for identifying a mobile telephone to a network operator; and FIG. 8, a schematic diagram of a further known identification mechanism for identifying a mobile telephone to a network operator, using the challenge & response technique.

DESCRIPTION OF THE EXEMPLARY EMBODIMENTS

In the drawings, the same reference numerals designate the same or functionally identical components.

FIG. 1 shows a schematic diagram of the subscribers and of the general system structure in a first embodiment of the method of the invention.

The identities for the system subscribers are generated by many identity generators (identity owners). The number of identity generators in FIG. 1 is n (a natural number); that is, the identity generators are $IG_1, IG_2, \ldots, IG_n$. The symbols G1 and G2 designate various groups for the identity generator $IG_1$.

The number of identity tests is m (a natural number); that is, the identity testers are $IP_1 \ldots IP_m$. OD in FIG. 1 designates an open directory, with SC1 . . . SCn are n freely available smart cards.

FIG. 2 shows a schematic diagram of the subscribers and of a special system structure in the first embodiment of the method of the invention.

This involves a mobile telephone system with n mobile telephone manufacturers as identity generators $M_1$ $M_n$ for individual identifications IMEI1, IMEI2, etc. In the system, there are m identity testers in the form of service providers $OP_1 \ldots OP_m$. It will be noted here that the identity can be generated and tested not only solely by the manufacturer but also by other sources designated by the symbol Auth, such as a government agency or other system administrators.

Every service provider $OP_1 \ldots OP_m$ and/or system monitor of administrator should be in a position to check the identity of a radio telephone, or IMEI for short (for International Mobile Equipment Identity) for genuineness, without having to keep large amounts of data on hand.

Genuineness means here that these devices indeed originated at the manufacturer, and that the manufacturer assigned the IMEI, which indirectly means here that the manufacturer vouches for the quality of the device and its technical characteristics when it left the factory.

FIG. 3 shows the fundamental principle of the first embodiment of the method of the invention.

This embodiment allows every service provider $OP_1 \ldots OP_m$ or every government agency or third party to check the genuineness of the identity for every device M in the network without having to see the mobile telephone or device. The tester P moreover need not make any request to the manufacturer, nor does it need any list of serial numbers or IMEI numbers and their individual secret keys. All that the tester P needs is an electronic card or smart card MSC from the manufacturer (or from the identity issuer/owner), and needs to request an open directory OR from the manufacturer (over the internet, for instance) only once. Every manufacturer offers a smart card to each tester P. These smart cards MSC can be considered a part of the open directory OR, as shown in FIG. 4.

The identification method in this embodiments proceeds in principle as follows:

The identity issuer initializes the mobile telephone M, in a preliminary procedure INI performed by a certification sector CC, by providing it with a secret identity SIMEI, which is stored in a writable but non-readable memory in the identity module 2' of the device M. The identity module 2' further has the capability, in response to a request, or executing a predetermined identification procedure. The identity module 2' should be a component of the device M that is essential to its life, which means that removal or replacement of the identity module 2' leads to a loss of function. The device M is also given an openly transmissible identity IMEI, which is stored in a nonvolatile memory of the device M that cannot be modified once it has been initially written.

The tester P asks for the identity of the mobile telephone M by means of an identity request IR, together with which a parameter CHv is forwarded.

In response to this, the mobile telephone M sends its identity IMEI to the tester P, together with an electronic signature SIGt Of the identity issuer (manufacturer) and a further parameter CHt.

The tester P requests a master test key EMIGK from the open directory OR on the internet.

From the smart card MSC from the manufacturer, the tester P becomes persuaded whether or not the manufacturer's signature is genuine. To that end, by means of the parameters IMEI, CHv, CHt and EMIGK, it generates a corresponding electronic signature SIGv and compares it with the electronic signature SIGt forwarded. If the two electronic signatures SIGt and SIGv match, the identity is genuine; if they do not, the identity is not genuine.

The system procedures and mechanisms will now be described in detail in conjunction with FIGS. 4-6.

FIG. 4 shows the preliminary initialization procedure INI in the first embodiment of the present invention.

The manufacturer/identity issuer assigns the identity IMEI for its device M in addition to the serial number, by the method agreed upon in the standard.

In a protected register in the device M, the manufacturer writes the first secret identity SIMEI, which the manufacturer generates by means of its own secret manufacturer's key MIGK (for Master Identity Generator Key). A one-way copy F1 generates the first secret identity SIMEI from the identity IMEI and the manufacturer's key MIGK:

$$\text{SIMEI} = F1(\text{IMEI}, \text{MIGK}) \tag{1}$$

Every manufacturer can provide one or more such keys MIGK for each group of devices.

The manufacturer publishes a public key EMIGK on its open internet home page OMHP. EMIGK is an enciphered copy of the manufacturer's key MIGK by means of the function F2, in which $$\text{EMIGK} = F2(\text{MIGK}, \text{SMMK}) \tag{2}$$

Here SMMK (Secret Manufacturer Master Key) is the primary secret key of the manufacturer. The manufacturer can provide one such entry for each type of device, or can use a single entry for all the types the manufacturer makes.

The manufacturer keeps the two keys SMMK and MIGK secret. However, the manufacturer furnishes the smart card MSC to the tester or testers P that contain the SMMK in a protected, nonreadable register (see FIG. 6), and that also contain the inverse function of F2, that is, $F2^{-1}$, which can generate the manufacturer's key MIGK from SMMK and EMIGK.

All the intermediate results in the smart card MSC (FIG. 6) and i the identity module 2' (FIG. 5) are physically unreachable (that is, they are accessible for neither writing nor reading). This should be guaranteed during production.

For the sake of security, the manufacturer can produce the smart card MSC itself, to mean the above-named conditions, or can order it from a trusted third party.

FIG. 5 shows the identity module in the mobile telephone, and its function, in the first embodiment of the present invention.

The tester P, for instance the network operator or the government agency, asks the device M for its identity in the request IR and asks for a signature for the random value CHv that is furnished along with the identity.

In its identity module 2', the device M generates the electronic signature SIGt as a function of the first secret identity SIMEI and CHv and as a function of a new random value CHt, which is generated by the device M, by means of the cryptographic function F3:

$$\text{SIGt} = F3(\text{SIMEI}, \text{CH}v, \text{CH}t) \tag{3}$$

The electronic signature SIGt is sent together with CHt and IMEI to the tester P as a certified identity, as shown in FIG. 3. CHv is already on hand at the tester P, because that is were it was generated.

The tester P calculates the corresponding electronic signature SIGv from IMEI, CHt, CHv, using the same cryptographic function F3:

$$\text{SIGv} = F3(\text{SIMEI}, \text{CH}v, \text{CH}t) \tag{4}$$

If SIGt=SIGv, then IMEI is considered to be authentic.

In the device M, a protected region is set up, which contains both a nonreadable register with SIMEI and the cryptographic copy F3 and a register with IMEI, which is preferably not modifiable. To that end, the device M includes a random generator CHt. All of these units are integrated together in a protected physical unit, in this case the identity module 2', as shown in FIG. 5. For generating the electronic signature SIGt of the device M, the following steps are performed:

A random value CHt is generated anew.

CHv and CHt are linked with SIMEI by the cryptographic one-way function F3. For example, CHT XOR CHv can be generated first and then copied by F3 using SIMEI as the key, as shown in FIG. 5. It is equally possible, as shown in FIG. 5, to multiplex CHv and CHt (the multiplexer controller is not shown) and then to deliver them to the XOR (+), with a feedback from the output of F3 to the XOR (+).

The device M then furnishes the following test vector tuplet, as a testable identity vector, to the tester:

$$\text{Test vector} = (\text{IMEI}, \text{SIG}t, \text{CH}t, \text{CH}v)$$

From the identity IMEI, which is an open identity, the type and the manufacturer of the device are known. The tester P can then easily retrieve the associated open test key EMIGK from the manufacturer's open directory OR over the internet. Alternatively, the tester can administer a list from the manufacturer and update it from time to time, to save on internet accesses, and then consult the internet directory of manufacturers only if the manufacturer is offering new types of equipment.

FIG. 6 shows the smart card in the tester, and its function, in the first embodiment of the present invention.

The tester P receives the test vector from the mobile telephone M and checks whether the signature SIGt proves the identity of the device, i.e. whether it is true that SIGv=SIGt. After that, the tester P has proof that the IMEI the device M says it has did indeed originate with the manufacturer. For that purpose, the smart card MSC from the manufacturer is necessary; it should be available to every tester P. This smart card MSC, as shown in FIG. 6, includes all three copies F1, F2$^{-1'}$, and Fe, as well as a protected register that can be written only once, with the secret key SMMK as the master secret key of the manufacturer/identity issuer, or secret manufacturer master key. As noted, the SMMK is written into the smart card MSC by the manufacturer/identity issuer. SMMK is not physically readable. The protected keys moreover obey the following rules:

1. They are not physically readable, preferably even if the equipment is opened and thereby destroyed.
2. They can be rewritten only if the up-to-date contents are known to the writer.

The tester P sends the test vector to the smart card MSC and performs the following operations:

From the Internet, the tester P retrieves the manufacturer's test key EMIGK, after having received the IMEI or type of device and the name of the manufacturer from the device M.

The tester P inputs the received components of the test vector, along with EMIGK, into the smart card MSC. The smart card MSC first deciphers EMIGK, with the aid of the key SMMK and the deciphered function F2$^{-1}$. This operation also produces the manufacturer/identity issuer master secret key MIGK. The hardware and software in the card MSC should not enable reading the MIGK.

The first secret identity SIMEI is then generated. This is done using MIGK and IMEI via the function F1, as FIG. 6 shows. Once again, the hardware and software in the card MSC should not enable reading the SIMEI.

SIMEI is linked internally with the two random variables CHt, CHv via the function F3, in the same way as in the smart card MSC, in order to obtain the electronic signature SIGv.

If SIGv=SIGt, then the identity IMEI is considered genuine, and the identity of the device is accepted; if not, the identification fails.

Although the present invention has been described above in terms of a preferred exemplary embodiment, it is not limited to that but instead can be modified in manifold ways.

For the copies F1, F2, and F3, the standardized cryptographic function in the mobile telephone system can be used. In that case, it is assumed that F1=F2=F3=SF (standard function).

This simplifies the makeup of the smart card MSG; since such smart cards already exist in the system, the manufacturers can use them. Since the SF is also present in the mobile telephone, the result in the final analysis is a highly effective implementation.

The invention claimed is:

1. A mobile telephone for use in an open, wireless telecommunications network, comprising:
    a non-volatile memory;
    an identity module configured to:
        store a mobile phone secret identity and store a mobile phone open identity in the non-volatile memory in the mobile telephone, the mobile phone secret identity being an encryption of the mobile phone open identity;
        receive an identity request with a first parameter from a testing device;
        generate an electronic signature by means of a first cryptographic function from the secret identity and at least the first parameter in the mobile telephone, and send the generated electronic signature and the open identity to the testing device;
        wherein the secret identity is such that the open identity of the mobile telephone is confirmed if the electronic signature matches a corresponding electronic signature generated by the testing device by application of the first cryptographic function to the secret identity;
        wherein the corresponding electronic signature is generated as a function of an open key; and
        wherein the electronic signature is generated from the secret identity, the first parameter and a second parameter and the first and second parameters are linked with the secret identity by means of an exclusive-OR function.

2. The mobile telephone of claim 1, wherein the secret identity is generated by a second cryptographic function from the open identity and a second secret key.

3. A mobile telephone for use in an open, wireless telecommunications network, comprising:
    a non-volatile memory;
    an identity module configured to:
        store a mobile phone secret identity and store a mobile phone open identity in the non-volatile memory in the mobile telephone, the mobile phone secret identity being an encryption of the mobile phone open identity;
        receive an identity request with a first parameter from a testing device;
        generate an electronic signature by means of a first cryptographic function from the secret identity and at least the first parameter in the mobile telephone, and send the generated electronic signature and the open identity to the testing device;
        wherein the secret identity is such that the open identity of the mobile telephone is confirmed if the electronic signature matches a corresponding electronic signature generated by the testing device by application of the first cryptographic function to the secret identity;
        wherein the corresponding electronic signature is generated as a function of an open key; and
        wherein the electronic signature is generated from the secret identity, the first parameter and a second parameter and the first and second parameters are multiplexed and then linked with the secret identity by means of an exclusive-OR function, with a feedback from the output of the first cryptographic function to the exclusive-OR function.

4. The mobile telephone of claim 1, wherein the first and/or second parameters are provided in the form of random variables.

5. A physical unit (M) for use in an open, wireless telecommunications network, the physical unit being configured to:
    store a secret identity (SIMEI) and an open identity (IMEI) in a memory in the physical unit (M);
    receive an identity request (IR) with the first parameter (CHv) from a testing device (P) at the physical unit (M);
    generate an electronic signature (SIGt) by means of a first cryptographic function (F1) from the secret identity (SIMEI) and at least the first parameter (CHv) in the physical unit (M), and send the generated electronic signature (SIGt) and the open identity (IMEI) to the testing device (P), so that the testing device may identify the physical unit (M) by a comparison of the electronic signature (SIGt) sent and a corresponding electronic signature (SIGv);

wherein the corresponding electronic signature (SIGv) is generated as a function of an open key; and wherein the electronic signature (SIGt) is generated from the secret identity (SIMEI), the first parameter (CHv) and a second parameter where the first parameter (CHv) and the second parameter are linked with the secret identity (SIMEI) by means of an exclusive-OR function.

6. The physical unit of claim 5, wherein the secret identity (SIMEI) is generated by a second cryptographic function (F2) from the open identity (IMEI) and a first secret key (MIGK).

7. The physical unit of claim 5, wherein the telecommunications network is a mobile telephone system.

\* \* \* \* \*